United States Patent [19]
Oka et al.

[11] Patent Number: 5,933,148
[45] Date of Patent: Aug. 3, 1999

[54] METHOD AND APPARATUS FOR MAPPING TEXTURE

[75] Inventors: Masaaki Oka, Kanagawa; Masakazu Suzuoki, Tokyo, both of Japan

[73] Assignee: Sony Corporation, Tokyo, Japan

[21] Appl. No.: 08/565,719

[22] Filed: Nov. 30, 1995

[30] Foreign Application Priority Data

Dec. 2, 1994 [JP] Japan .................................. 6-300026

[51] Int. Cl.[6] .................................................. G06T 17/40
[52] U.S. Cl. ........................... 345/427; 345/423; 345/430
[58] Field of Search .................................... 395/130, 129, 395/118, 126; 345/418, 423, 429, 427, 430

[56] References Cited

U.S. PATENT DOCUMENTS

| | | | |
|---|---|---|---|
| 4,811,124 | 3/1989 | Dujari .................................. | 369/59 X |
| 5,224,208 | 6/1993 | Miller, Jr. et al. ...................... | 345/425 |
| 5,285,275 | 2/1994 | Abe ........................................ | 348/384 |
| 5,291,468 | 3/1994 | Carmon .................................. | 369/48 X |
| 5,307,450 | 4/1994 | Grossman .............................. | 345/423 |
| 5,471,450 | 11/1995 | Yonemitsu .............................. | 369/60 |
| 5,491,677 | 2/1996 | Sasaki .................................... | 369/60 X |
| 5,553,208 | 9/1996 | Murata et al. .......................... | 345/425 |
| 5,561,746 | 10/1996 | Murata et al. .......................... | 345/419 |
| 5,566,285 | 10/1996 | Okada .................................... | 345/430 |
| 5,594,846 | 1/1997 | Donovan ................................ | 345/430 |
| 5,649,081 | 7/1997 | Nakajima et al. ...................... | 345/430 |
| 5,649,082 | 7/1997 | Burns ...................................... | 345/430 |
| 5,706,418 | 1/1998 | Uchiyama .............................. | 345/430 |
| 5,719,599 | 2/1998 | Yang ...................................... | 345/430 |

FOREIGN PATENT DOCUMENTS

| | | |
|---|---|---|
| A-0 210 423 | 4/1987 | European Pat. Off. . |
| A-0 522-853 | 1/1993 | European Pat. Off. . |
| A-0 590 881 | 4/1994 | European Pat. Off. . |
| A-2-195-519 | 7/1988 | United Kingdom . |
| 2-231-245 | 7/1990 | United Kingdom . |
| A-2272137 | 4/1994 | United Kingdom . |
| WO 84/02027 | 5/1984 | WIPO . |

OTHER PUBLICATIONS

Foley et al., Computer Graphics Principles and Practice, 2d, Addison–Wesley, 741–744, 1990.

SMPTE Journal, vol. 100, No. 3, Mar. 1991, US, pp. 162–166, XP000178490, Vigneaux, et al.: "A Real–Time Video Mapping and Manipulating System".

Eurographics, Sep. 4–8, 1989, Amsterdam, pp. 257–268, SP000132231, Bennis and Gagalowicz: "Hierarchical Texture Synthesis on 3–D Surfaces".

Computer Technology Review, Special Summer Issue, (Jul. 11, 1991), No. 9, Integrating Image Processing With Standard Workstation Platforms by David Pfeiffer, pp. 103, 104, 106, & 107.

IEEE Computer Graphics and Application, 11 (Mar. 1991), No. 2, Graphics Workstations: A European Perspective by Ken Robbins, Mark Martin, Max Mehl, Allan Davison, Kieron Drake and Mel Slater, pp. 91–103.

*Primary Examiner*—Anton Fetting
*Attorney, Agent, or Firm*—Fulwider Patton Lee & Utecht, LLP

[57] ABSTRACT

In a real-time texture mapping system, a more solid and naturally-mapped image is obtained with a minimum of computation volume. The texture-mapping system adds a texture image to an area of a polygon which forms a fundamental unit of three-dimensional image information of an object to be displayed on a screen. A geometry transfer engine (GTE) 61 extracts representing points from the polygonal area. Then, coordinates of the thus extracted representing points are subjected to the perspective transformation. Thereafter, the representing points, after the perspective transformation, are subjected to the linear interpolation in a graphic processing unit (GPU) 62 so that the image is formed.

22 Claims, 12 Drawing Sheets

CONSTRUCTION OF VIDEO GAME APPARATTUS

METHOD AND APPARATUS FOR MAPPING TEXTURE

This application claims priority under the International Convention based upon Japanese Patent Application No. P06-300026 filed Dec. 2, 1994.

BACKGROUND OF THE INVENTION

The present invention relates generally to texture mapping systems and, more particularly, to a new and improved method and apparatus for mapping texture which creates an image through a technique of texture mapping in an instrument using computer graphics such as video game apparatus, graphic computers and like instruments.

Heretofore, in home TV game apparatus, personal computers, graphic computers and the like, an image generating unit has been used to create data of an image being outputted and displayed, i.e., displayed output image data appearing in TV receivers, monitor receivers, or CRT display units and the like. In such image generating units, there is provided an exclusive image-formation unit between a CPU and a frame buffer so as to realize high-speed processing.

In the image generating unit described above, the CPU does not directly access the frame buffer, but issues an image-formation instruction to the image-formation unit to prepare a fundamental figure, such as fundamental triangles and quadrangles. Then, the image-formation unit interprets the instruction issued from the CPU to form an image in the frame buffer. A minimum unit of a figure treated in the image-formation unit is referred to as a polygon or primitive. An instruction to form such a primitive image is referred to as an image-formation instruction.

For example, if a three-dimensional object OB is displayed, the object OB may be divided into three parts, each part constituting a primitive and the CPU issues necessary image-formation instructions corresponding to each of those primitives to the image-formation unit.

Next, in order to enhance similarity between the thus formed image and the object, a so-called technique of texture mapping is frequently employed in the data processing.

Texture mapping is a technique for adding a surface texture pattern to a surface of the polygon forming the object, the texture pattern being a two-dimensional image independently prepared as a texture source image as shown.

A known technique of high-speed texture mapping with a minimum circuit size is a so-called linear transformation. In the linear transformation, coordinates B (u, v) of the texture source image corresponding to a point A (x, y) within the polygon are calculated as follows:

$$u=ax+by$$

$$v=cx+dy$$

where each of a, b, c and d is a constant depending on a shape of the polygon. In texture mapping using the linear transformation, mapping or transformation to a shape other than parallelograms causes a diagonal image deformation.

Another known technique of texture mapping for releasing the image from such diagonal image deformation due to the linear transformation is a quadratic transformation. In this quadratic transformation, the coordinates B (u, v) of the texture source image corresponding to the point A (x, y) within the polygon are calculated as follows:

$$u=ax+bxy+cy$$

$$v=dx+exy+fy$$

where each of a, b, c, d, e and f is a constant depending on a shape of the polygon. Although this technique of texture mapping using the quadratic transformation is larger in computational volume than that of texture mapping using the linear transformation, it is capable of providing a naturally mapped image. However, even this technique of texture mapping using the quadratic transformation can not make the image look solid. In this regard, the image fails to provide a perspective view in depth, i.e., in a direction perpendicular to the paper.

An additional known technique for completely solving the above problem is a so-called perspective transformation. In the perspective transformation, the coordinates B (u, v) of the texture source image corresponding to a point A (x, y, z) within the polygon are calculated as follows:

$$u=(ax+by)/z$$

$$v=(cx+dy)/z$$

where each of a, b, c and d is a constant depending on a shape of the polygon. As is clear from the above, in calculation of the texture mapping using the perspective transformation, there is required depth information (z) before the polygon is projected onto a computer screen. Further, in this calculation, there is additionally required a division process for each of the points to be subjected to the texture mapping. Although this perspective transformation is not realistic in real-time systems, it is capable of preparing a very naturally mapped solid image.

In the texture mapping using the linear transformation described above, when mapping or transformation to a shape other than parallelograms is performed, the diagonal image deformation occurs. This is a problem inherent in the linear transformation.

Further, in the texture mapping using the quadratic transformation, it is possible to obtain a naturally mapped image. However, the thus obtained image fails to provide a perspective view in depth, i.e., in a direction perpendicular to the paper. This is a problem inherent in the quadratic transformation.

In the texture mapping using the perspective transformation described above, it is possible to obtain a very naturally mapped solid image. However, in calculation of the texture mapping using the perspective transformation, there is required depth information (z) before the polygon is projected onto a computer screen. Further, in this calculation, there is additionally required a division process for each of the points to be subjected to the texture mapping. Consequently, the perspective transformation is not realistic in real-time systems. This is a problem inherent in the perspective transformation.

Accordingly, there has been a long existing need for enhanced image processing providing for simplified texture mapping transformation with reduced image distortion and minimal required calculation. The present invention clearly fulfills these needs.

SUMMARY OF THE INVENTION

Briefly, and in general terms, the present invention provides enhanced real-time texture mapping which produces a naturally-mapped realistic or solid image with a minimum calculation volume.

In accordance with the invention, by way of example and not necessarily by way of limitation, there is provided a new and improved method and apparatus for mapping texture, i.e., adding a texture image to a polygonal area forming a fundamental unit of information as to a three-dimensional image of an object to be graphically displayed, which includes a representative or representing point extracting means for extracting a representative or representing point from the polygonal area, a perspective-transformation means for performing a perspective transformation of the coordinates of the representing point having been extracted through the representing-point extracting means, and a linear-interpolation means for performing a linear interpolation between the representing points having been subjected to the perspective transformation through the perspective-transformation means, so that the image information, in which the texture image is added to the polygonal area, is obtained as an interpolation output issued from the linear-interpolation means.

In the system of the present invention for performing the texture mapping, the representing-point extracting means extracts the representing points, the number of which varies in accordance with the size of the polygonal area.

In accordance with the present invention for performing the texture mapping, the representative or representing point is extracted by the representing point extracting means from an area of the polygonal shape forming a fundamental unit of three-dimensional image information, the information being provided for construction of an object to be displayed, coordinates of the thus extracted point are subjected to the perspective transformation through the perspective transformation means, and the linear interpolation between the representing points having been subjected to the perspective transformation through the perspective-transformation means is then performed.

The representing point extracting means extracts the representing points, and the number of these points varies in accordance with the size of the polygonal area.

Hence, the present invention satisfies a long existing need for enhanced image processing providing for simplified texture mapping transformation with reduced image distortion and minimal required calculation.

These and other objects and advantages of the invention will become apparent from the following more detailed description, when taken in conjunction with the accompanying drawings of illustrative embodiments.

DESCRIPTION OF THE PREFERRED EMBODIMENTS

Figure 1:
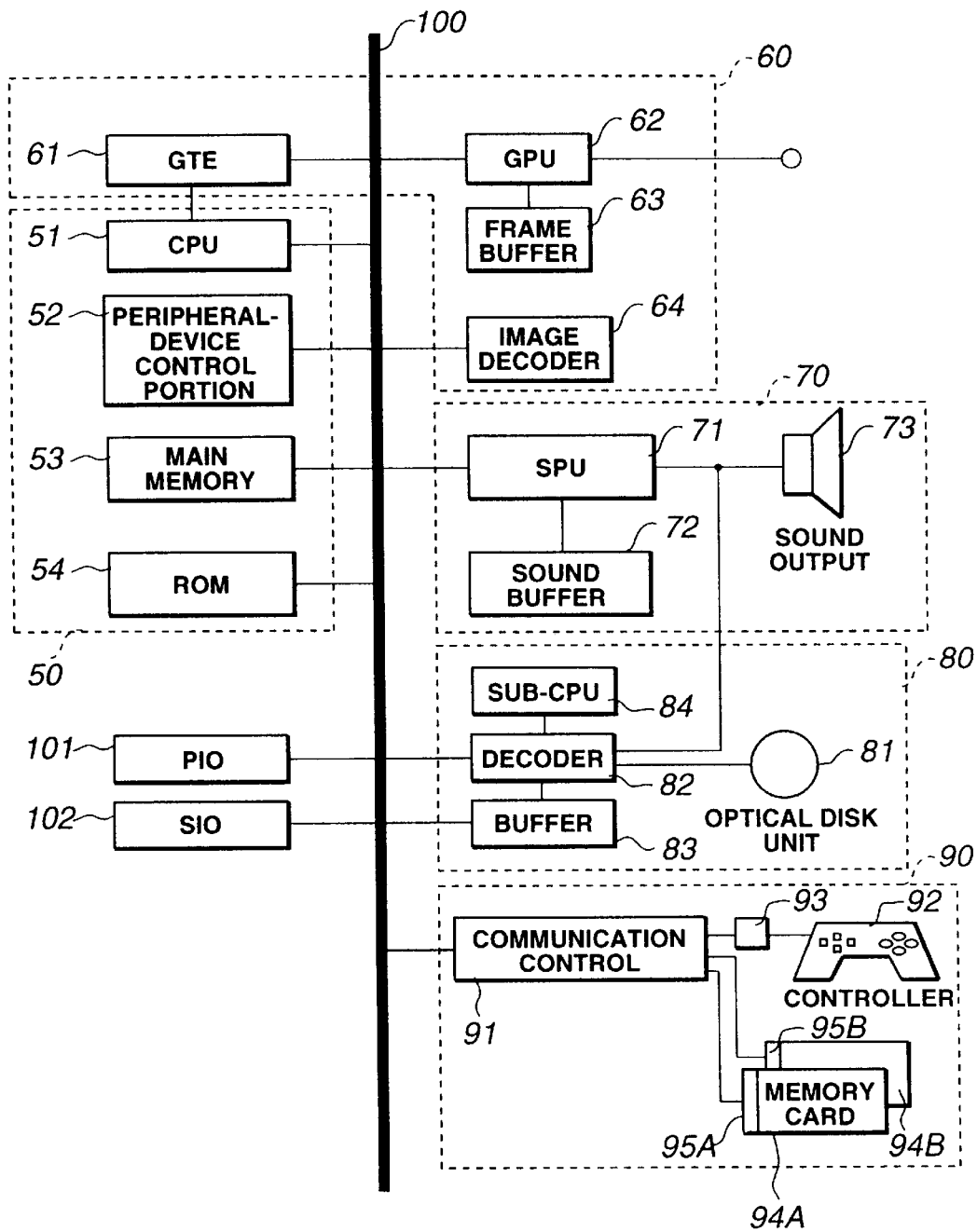
FIG. 1 is a block diagram of the overall system of a video game apparatus according to the present invention.

Referring now to the drawings, like reference numerals denote like or corresponding parts throughout the drawing figures.

Figure 13A:
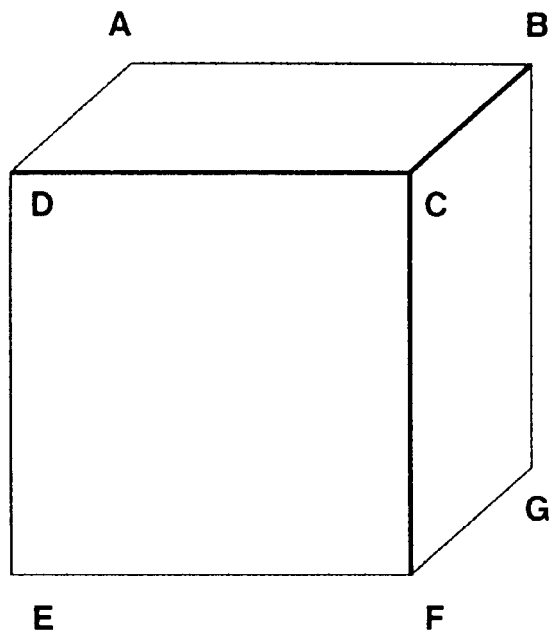
FIGS. 13(A) and 13(B) are views illustrating the image-formation operation in the video game apparatus referred to above.
Figure 13B:
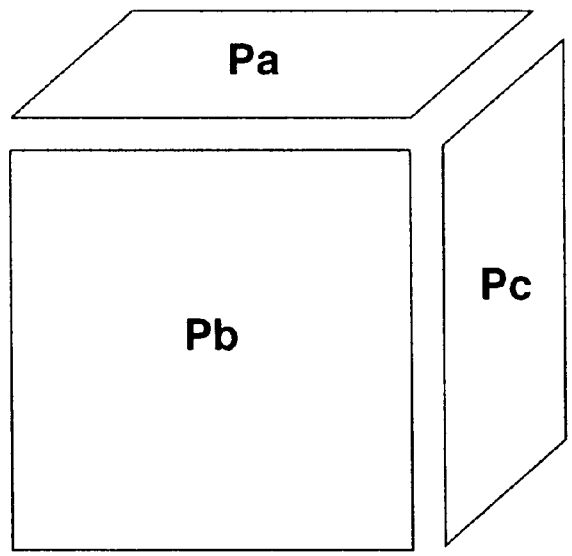

As shown in FIG. 13(A), if a three-dimensional object OB is displayed, as shown in FIG. 13(B), the object OB is divided into three parts, i.e., primitives Pa, Pb and Pc, and the CPU issues necessary image-formation instructions corresponding to the primitives Pa, Pb, Pc to the image-formation unit.

At this time, in order to improve similarity between the thus formed image and the object, a technique of texture mapping is frequently employed.

Figure 14:
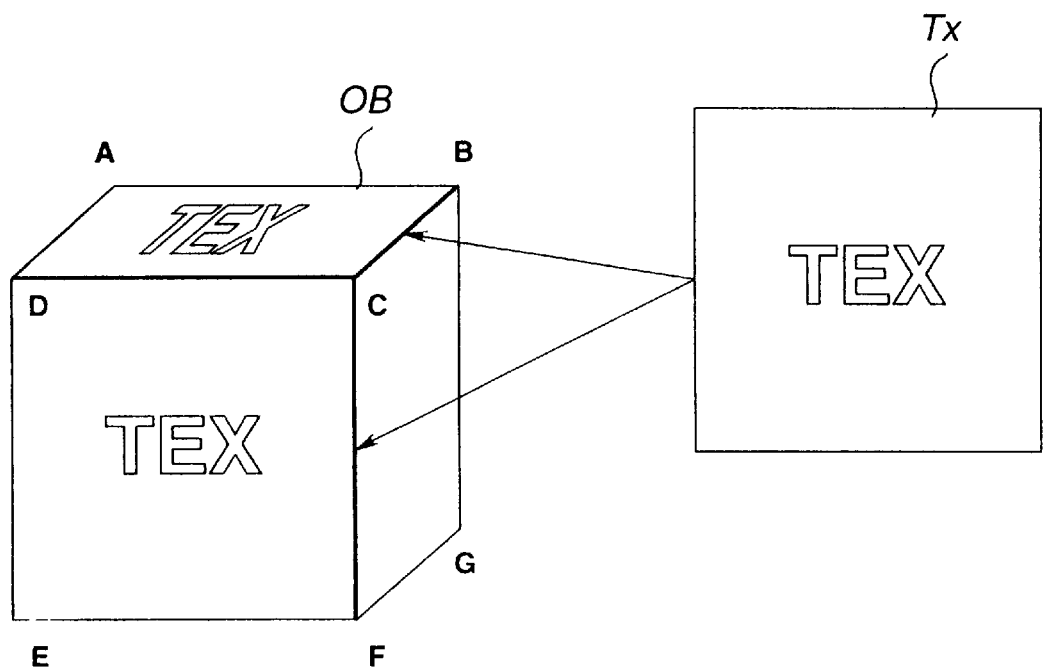
FIG. 14 is a view illustrating the texture-mapping operation in the video game apparatus referred to above.

As previously indicated, the texture mapping is a technique for adding a surface texture pattern Tx to a surface of the polygon forming the object, the texture pattern Tx being a two-dimensional image independently prepared as a texture source image as will be observed in FIG. 14. In FIG. 14, there is shown an example of texture mapping applied to the surface of the object OB from FIG. 13(A).

Figure 15:
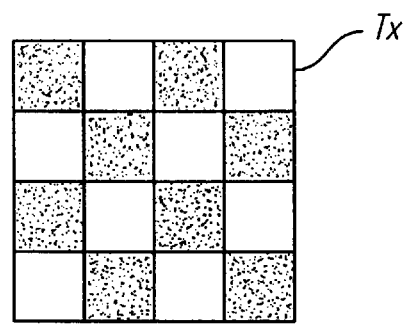
FIG. 15 is a view illustrating the texture pattern.
Figure 16A:
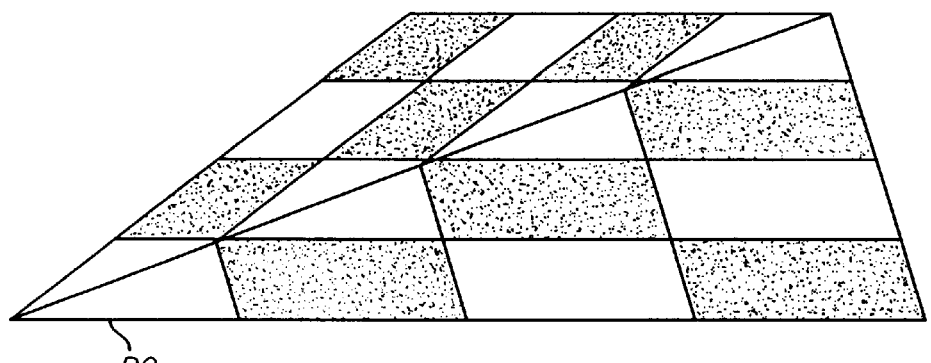
FIGS. 16(A)–16(C) are views illustrating the results of the texture mapping in the video game apparatus referred to above.

A known technique of high-speed texture mapping with a minimum circuit size is a so-called linear transformation. In the linear transformation, coordinates B (u, v) of the texture source image corresponding to a point A (x, y) within the polygon are calculated as follows:

$$u = ax + by$$

$$v = cx + dy$$

where each of a, b, c and d is a constant depending on a shape of the polygon. In texture mapping using the linear transformation, for example, as shown in FIG. 15, if a diced texture patter Tx is added to a surface of the polygon, an example of such mapping is shown in FIG. 16(A). As is clear from this example, mapping or transformation to a shape other than parallelograms causes a diagonal image deformation.

Figure 16B:
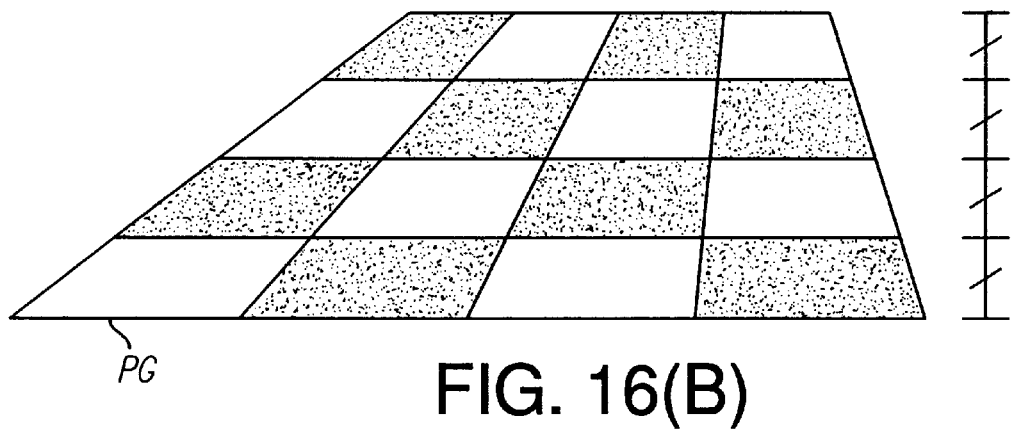

Another known technique of texture mapping for releasing the image from such diagonal image deformation due to the linear transformation is a quadratic transformation. In this quadratic transformation, the coordinates B (u, v) of the texture source image corresponding to the point A (x, y) within the polygon are calculated as follows:

$$u = ax + bxy + cy$$

$$v = dx + exy + fy$$

where each of a, b, c, d, e and f is a constant depending on a shape of the polygon. Although this technique of texture mapping using the quadratic transformation is larger in computational volume than that of texture mapping using the linear transformation, it is capable of providing a naturally mapped image, as shown in FIG. 16(B). However, even the technique of texture mapping using the quadratic transformation can not make the image look solid, i.e., the image shown in FIG. 16(B) fails to provide a perspective view in depth, i.e., in a direction perpendicular to the paper.

Figure 16C:
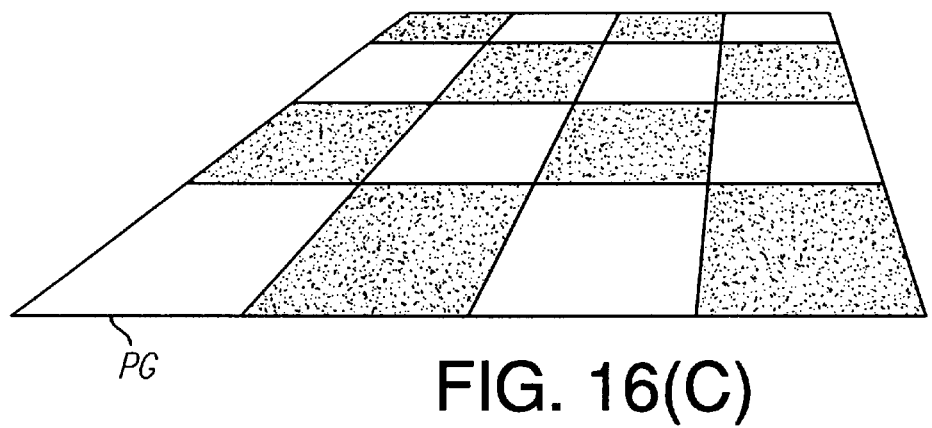

A further technique for completely solving the above problem is a so-called perspective transformation. In the perspective transformation, the coordinates B (u, v) of the texture source image corresponding to a point A (x, y, z) within the polygon are calculated as follows:

$$u = (ax + by)/z$$

$$v = (cx + dy)/z$$

where each of a, b, c and d is a constant depending on a shape of the polygon. As is clear from the above, in calculation of the texture mapping using the perspective transformation, there is required depth information (z) before the polygon is projected onto a computer screen. Further, in this calculation, there is additionally required a division process for each of the points to be subjected to the texture mapping. Although this perspective transformation is not realistic in real-time systems, it is capable of preparing a very naturally mapped solid image as shown in FIG. 16(C).

In accordance with the invention, there is provided a new and improved method and apparatus for mapping texture, i.e., adding a texture image to a polygonal area forming a fundamental unit of information as to a three-dimensional image of an object to be graphically displayed, which includes a representative or representing point extracting means for extracting a representative or representing point from the polygonal area, a perspective-transformation means for performing a perspective transformation of the coordinates of the representing point having been extracted through the representing-point extracting means, and a linear-interpolation means for performing a linear interpolation between the representing points having been subjected to the perspective transformation through the perspective-transformation means, so that the image information, in which the texture image is added to the polygonal area, is obtained as an interpolation output issued from the linear-interpolation means.

In the system of the present invention for performing the texture mapping, the representing-point extracting means extracts the representing points, the number of which varies in accordance with the size of the polygonal area.

In accordance with the present invention for performing the texture mapping, the representative or representing point is extracted by the representing point extracting means from an area of the polygonal shape forming a fundamental unit of three-dimensional image information, the information being provided for construction of an object to be displayed, coordinates of the thus extracted point are subjected to the perspective transformation through the perspective transformation means, and the linear interpolation between the representing points having been subjected to the perspective transformation through the perspective-transformation means is then performed.

The representing point extracting means extracts the representing points, and the number of these points varies in accordance with the size of the polygonal area.

An embodiment of the method and apparatus of the present invention for performing the texture mapping is next described.

Referring now more particularly to FIG. 1, the system of the present invention for performing the texture mapping is applied to a video game apparatus.

In this video game apparatus, a game is performed by retrieving and executing a game program stored in an auxiliary memory, such as optical disks and the like, in accordance with a user's instruction. The game apparatus has the overall system arrangement shown in FIG. 1.

This video game system includes: a control system 50 comprising a central processing unit (i.e., CPU 51) and its peripheral devices; a graphic system 60 comprising a graphic processing unit (i.e., GPU 62) for forming an image in a frame buffer 63, a sound system 70 comprising a sound processing unit (i.e., an SPU); an optical-disk control subsystem 80 for controlling an optical disk forming an auxiliary memory, a communication control subsystem 90 for controlling both an input instruction issued from a controller operated by a user and an input/output signal issued from the auxiliary memory which stores the initial setting data of the game, and a bus 100 connected to the above components 50, 60, 70, 80, and 90.

The control system 50 is provided with the CPU 51, a peripheral-device controller 52 for performing necessary controls such as interrupt control, direct-memory access transfer control and like controls, a main memory 53 comprising a random access memory (i.e., RAM), and a read only memory (i.e., ROM 54) storing a program such as a so-called operating system and like programs for controlling the main memory 53, graphic system 60, sound system 70 and like systems. The CPU 51 executes the operating system stored in the ROM 54 to control the entire computer system, and typically comprises a 32-bit RISC CPU.

When a power switch of the video game system shown in FIG. 1 is turned on, the CPU 51 of the control system 50 executes the operating system stored in the ROM 54 to control the graphic system 60, sound system 70 and like systems. When the operating system is executed, the CPU 51 initializes the entire computer system to do its performance check, and thereafter controls the optical-disk control subsystem 80 to execute a game program or the like stored in the optical disk. By executing the game, the CPU 51 controls the graphic system 60, sound system 70 and like systems in accordance with an instruction inputted by the user, so as to control an image in a display, sound effects and musical sounds in production.

The graphic system 60 is provided with a geometry transfer engine (i.e., GTE 61) for performing a coordinate transformation and like processing, a GPU 62 for forming an image according to an image-formation instruction issued from the CPU 51, a frame buffer 63 for storing the image thus formed by the GPU 62, and, an image decoder 64 for decoding an image data, the image data having been compressed and encoded through a so-called orthogonal transformation, such as the well known discrete-cosine transformation and like transformations.

Upon receipt of an instruction or demand for computation issued from the CPU 51, the GTE 61 employs its parallel computing mechanism for executing a plurality of computations in parallel with each other and is capable of performing computations at high speed, which computations are of coordinate transformations, of light sources, of matrixes, or of vectors. More specifically, for example, in computation for realizing a so-called flat shading through which an image is formed into a triangular polygon with a single color, the GTE 61 executes computations of the coordinates at a maximum rate of approximately one and a half million polygons (1,500,000) per second, which enables the CPU 51 in the video game apparatus to reduce its load and permits the system to execute computations of the polygon's coordinates at high speed.

Further, in accordance with an image-formation instruction issued from the CPU 51, the GPU 62 forms an image of the polygon and like shapes in the frame buffer 63. This GPU 62 is capable of forming up to three hundred and sixty thousand images of polygons per second.

In the aforementioned embodiment, the CPU 51 has a series of image-formation instructions for generating single frame images in the main memory 53. These instructions are provided with their own addresses which identify the image-formation instructions to be executed. A controller 52 is provided for controlling the peripheral devices. This is a DMA controller which transfers the image-formation instructions from the main memory 53 to the GPU 62. Then, the GPU 62 executes the image-formation instructions issued from the DMA controller to obtain results which are then stored in the frame buffer 63. The DMA controller finds and executes a subsequent instruction by means of its address, after completion of transfer of one image-formation instruction.

Figure 2:
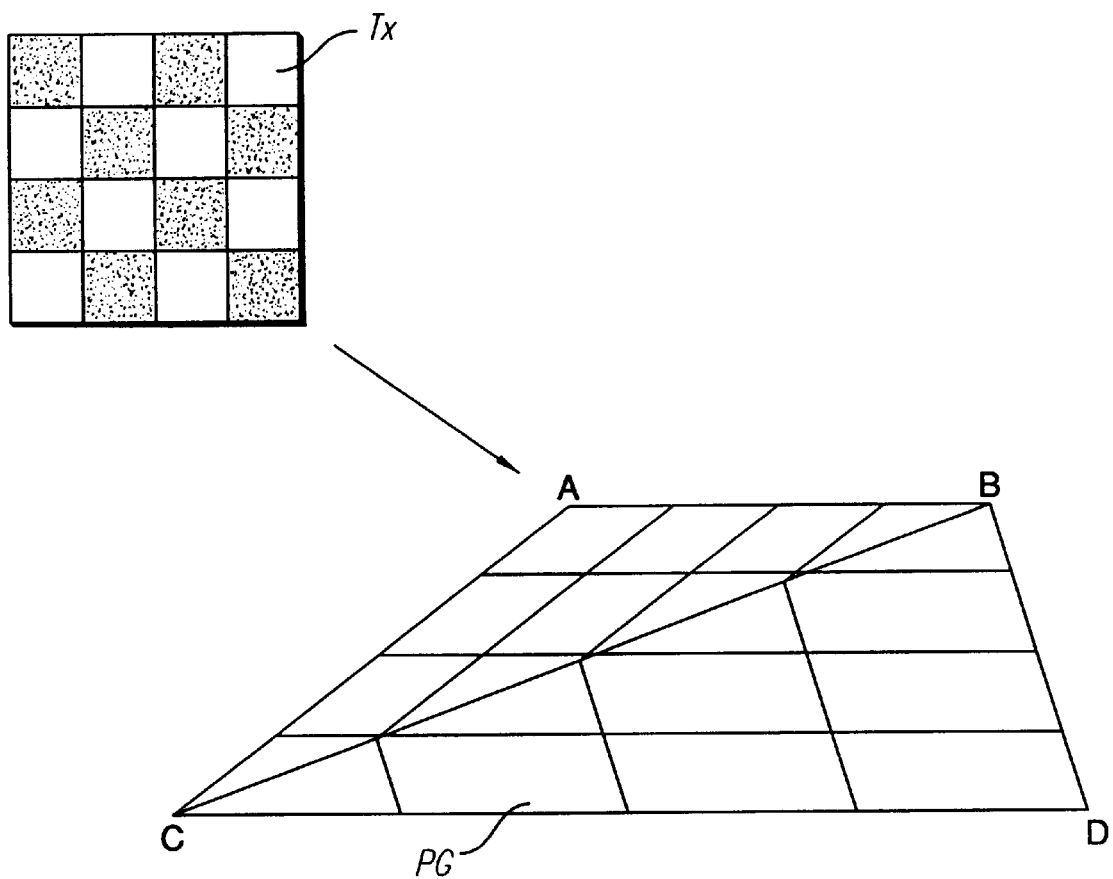
FIG. 2 is a schematic diagram illustrating an example of the texture pattern to be mapped on a polygon.
Figure 3:
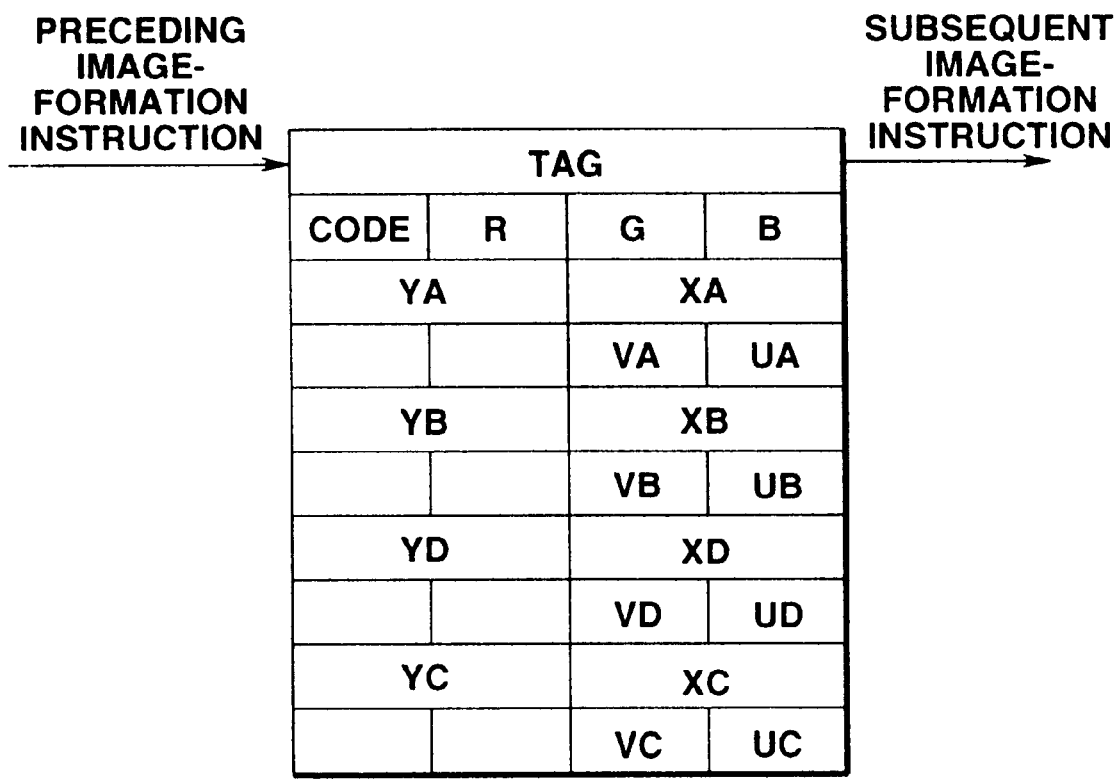
FIG. 3 is a view illustrating the contents of an image-formation instruction of a quadrangle to which the texture mapping is applied.

As shown in FIG. 2, if a diced texture pattern Tx is mapped or transformed into a trapezoidal polygon PG in image formation, an image-formation instruction "A" for performing such texture mapping of a quadrangle ABCD in image formation is provided as shown in FIG. 3.

In this regard, described first in image formation are a plurality of vertex coordinates (XA, YA), (XB, YB), (XD, YD), (XC, YC) of the quadrangle ABDC an image of which is formed, and a plurality of texture coordinates (UA, VA), (UB, VB), (UD, VD), (UC, VC) corresponding to such vertex coordinates. When a series of image-formation instructions described above is executed, the GPU 62 forms an image of the polygon on the frame buffer 63, the image having been modified by the texture mapping through a linear transformation.

Figure 4:
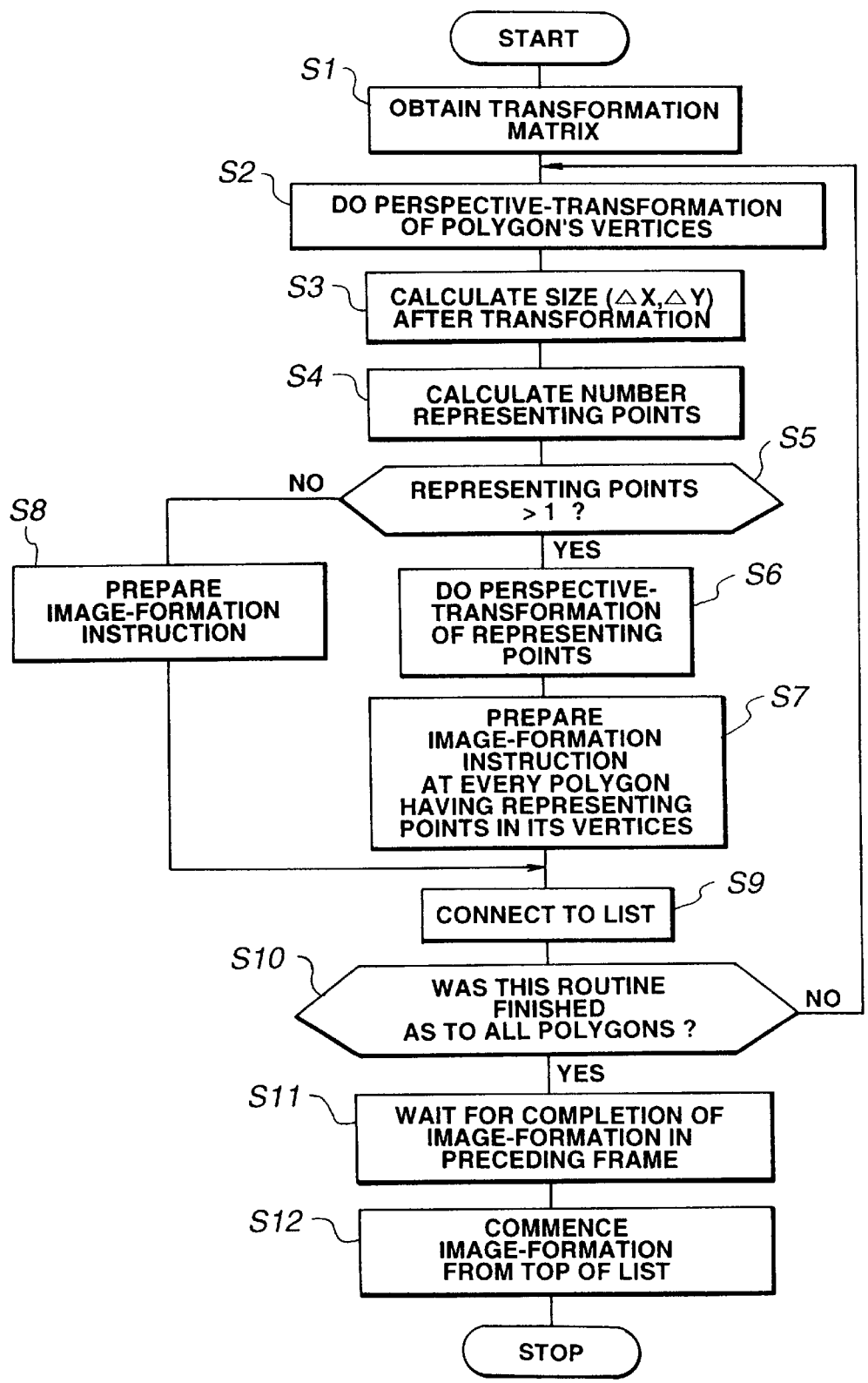
FIG. 4 is a flow chart illustrating the processing procedure of the image of one frame in the video game apparatus of FIGS. 1–3.

In this embodiment, for example, as shown in a flow chart of FIG. 4, the processing for forming the image of a single frame comprises a step S1 in which a transformation matrix is obtained. Then, in a subsequent step S2, when the image-formation instruction "A" and depth coordinates (ZA, ZB, ZD, ZC) in the instruction are given, each of the vertex coordinates (XA, YA), (XB, YB), (XD, YD), (XC, YC) is subjected to perspective transformation.

Figure 5:
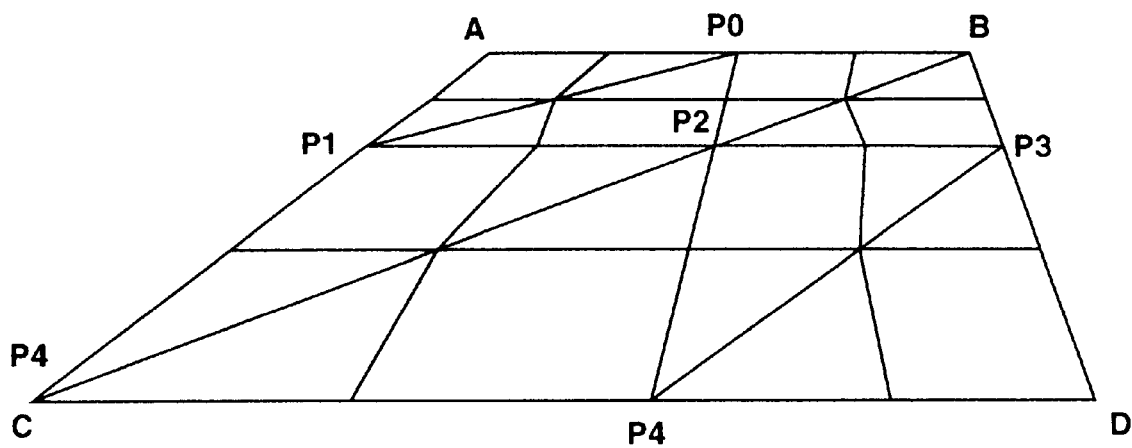
FIG. 5 is a view illustrating the representing point in the processing of the image of the one frame.

In a step S3, sizes (delta X, delta Y) after completion of the perspective transformation are calculated based on the vertex coordinates (XA, YA), (XB, YB), (XD, YD), (XC, YC). As a result, in step S4, for example, as shown in FIG. 5, the number of the representing points Pn and its locations are determined. As described above, by adequately varying the representing points Pn in number, it is possible to optimize a computation volume in the CPU.

In a subsequent set S5, it is judged whether or not the number of the representing points is more than one. When the number of the representing points is more than one, the step S5 is followed by a subsequent step S6 in which the vertex coordinates (xn, yn) corresponding to coordinates (UPn, VPn) of the representing points Pn are determined through the perspective transformation.

Then, in a step S7, the quadrangle ABCD is divided into four small quadrangles APOP2P1, POBP3P2, P1P2P4C and P2P3DP4, each of which uses its representing points as its vertices, so that a series of respective image-formation instructions B0 to B4 are generated. In other words, previously calculated values or coordinates (XA, YA), (XB, YB), (XD, YD), (XC, YC) and (UA, VA), (UB, VB), (UD, VD), (UC, VC) are set as the vertex coordinates and the texture coordinates of each of sub-image formation instructions Bn.

It should be noted that, when the number of the representing points determined in the step S4 is one in the step S5, the step S5 is followed by a step S8 in which an image-formation instruction is immediately prepared.

Figure 6:
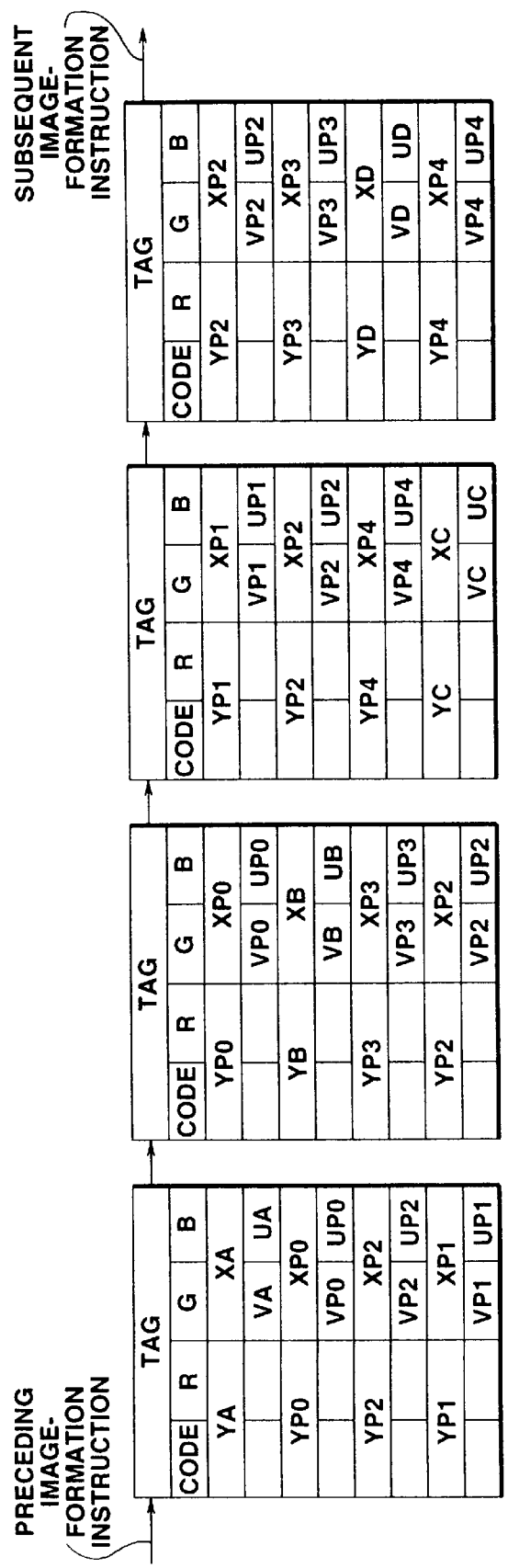
FIG. 6 is a view illustrating the image-formation list prepared in the processing of the image of the one frame.

In a subsequent step S9 following the step S8, as shown in FIG. 6, an image-formation instruction list is prepared by setting an address of a series of the sub-image formation instructions Bn in a tag of a series of the sub-image formation instructions Bn-1, and the thus prepared list is replaced with the original image-formation instruction "A".

Then, in a step S10 following the step S9, it is judged whether or not the processing is completed as to all of the polygons. When some one of the polygons remains unprocessed, the processing procedure returns to the step S2, i.e., the step S10 is followed by the step S2 in which additional perspective transformation of such remaining polygon's vertices is conducted.

On the other hand, in the step S10, when it is found that no polygon remains unprocessed, the step S10 is followed by a step S11 in which the processing procedure waits for completion of image formation in a preceding frame. The step S11 is followed by a step S12 in which the processing procedure commences to form the images from the top of the list.

Figure 7:
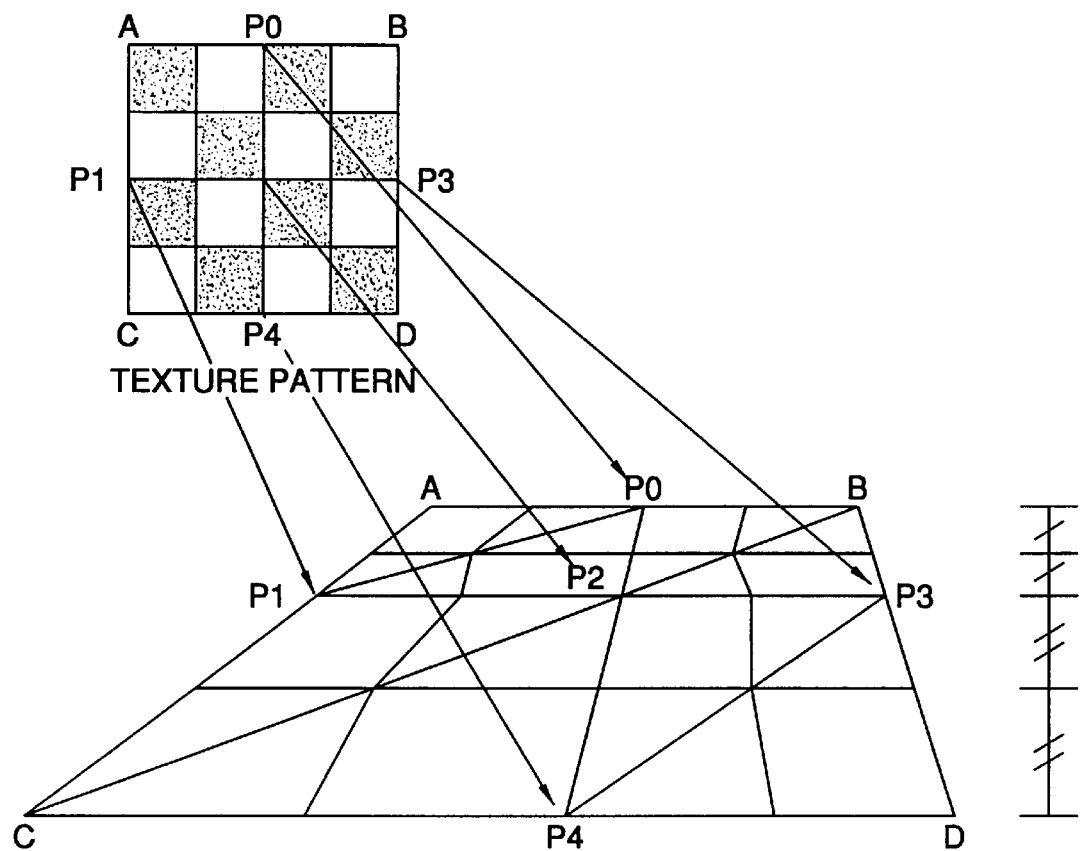
FIG. 7 is a view illustrating the texture pixel determined by executing the linear interpolation in the processing of the image of the one frame.
Figure 8:
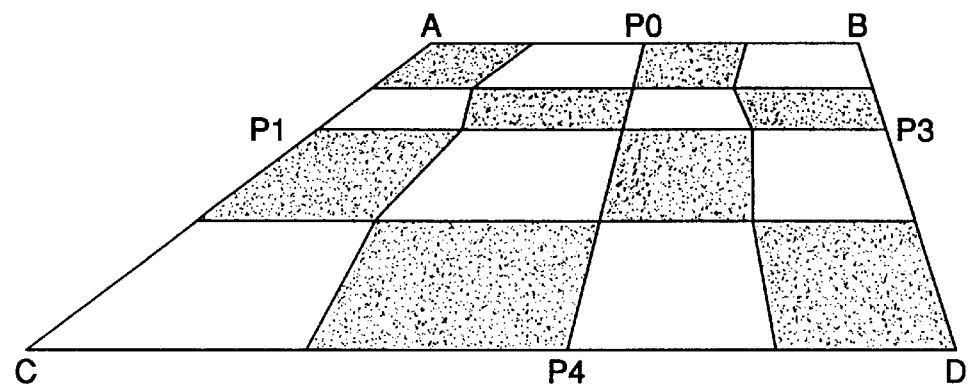
FIG. 8 is a view illustrating the results of the image formation on the frame buffer in the processing of the image of the one frame.

As shown in FIG. 7, the GPU 62 determines a texture pixel other than the above-described representing points by performing a linear interpolation between the representing points having been subjected to the perspective transformation, so that the image is formed in the frame buffer 63, as shown in FIG. 8.

As described above, the computation follows the processing procedure of the flow chart shown in FIG. 4, where the representing points are extracted from the polygons, each of which is used as a fundamental unit of three-dimensional image information forming an object to be displayed, the thus extracted representing points have their coordinates subjected to the perspective transformation, and the linear interpolation is conducted between such representing points having been subjected to the perspective transformation. This considerably reduces the required computation volume and is capable of producing a real-time solid and naturally mapped image.

In the aforedescribed embodiment of the invention, the frame buffer 63 is constructed of a so-called dual-port RAM, and is capable of simultaneously performing image formation based on the instruction issued from the GPU 62, transfers from the main memory, and a data retrieving operation for display. A typical capacity of the frame buffer 63 is 1 MB which is capable of providing a 16-bit matrix having a size of 1024 (Horizontal)×512 (Vertical) pixels. Furthermore, the frame buffer 63, in addition to the video-output display area is also provided with a CLUT area for storing a color look up table (CLUT) which the GPU 62 refers to in image formation of the polygons, and a texture area for storing a texture to be mapped or transformed into the polygons which have their images formed by the GPU 62 after completion of the coordinate transformation. Both the CLUT area and the texture area are dynamically modified as the display area is modified.

Figure 9:
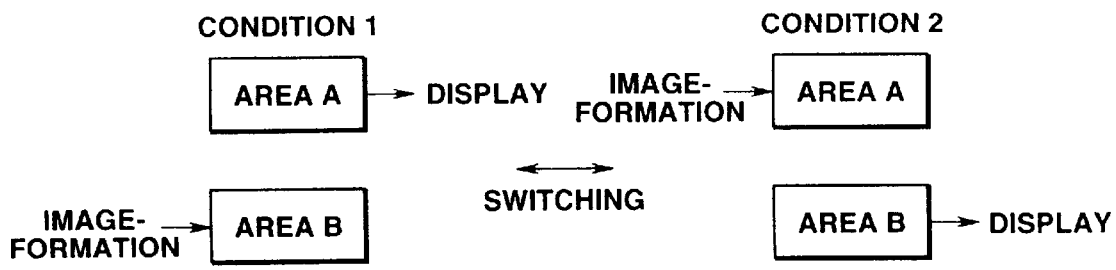
FIG. 9 is a view illustrating the switching conditions of the frame buffers conducted by the GPU in the video game apparatus referred to above.

In addition, as shown in FIG. 9, the GPU 62 provides a pair of square-shaped areas "A", "B", and forms the image on one of the "B" areas while having the contents of the other "A" area displayed. After completion of the image formation, the square-shaped areas "A", "B" are replaced during the period of time of a vertical retrace so as to prevent rewriting operations from being displayed.

Moreover, the GPU 62 is capable of providing, in addition to the above-described flat shading, a Gouraud shading for determining a color of the polygon by performing interpolation based on colors of the vertices of the polygons, and a texture mapping for adding a texture stored in the texture area to the polygons. In each of the Gouraud shading and the texture mapping, the GTE 61 is capable of computing up to approximately five hundred thousand of the polygon's coordinates per second.

Further, the GPU 62 supports ten frame modes shown in the following Table 1 when it issues the contents of a desired one of the square-shaped areas of the frame buffer 63 as its video output.

TABLE 1

| | FRAME RESOLUTION | |
|---|---|---|
| Mode | Standard Resolution | Remarks |
| Mode 0 | 256(H) × 240(V) | Non-interlacing |
| Mode 1 | 320 × 240 | |
| Mode 2 | 512 × 240 | |
| Mode 3 | 640 × 480 | |
| Mode 4 | 256 × 480 | Interlacing |
| Mode 5 | 320 × 480 | |
| Mode 6 | 512 × 480 | |
| Mode 7 | 640 × 480 | |
| Mode 8 | 384 × 240 | Non-interlacing |
| Mode 9 | 384 × 240 | Interlacing |

Figure 10:
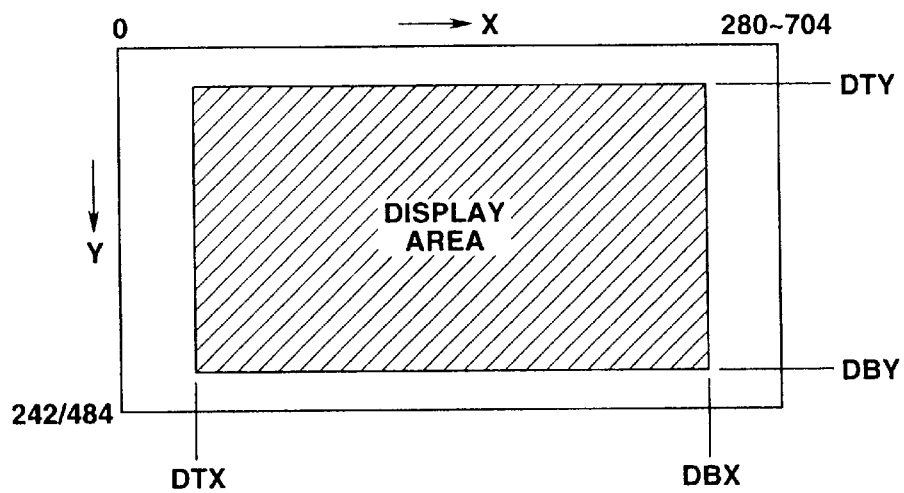
FIG. 10 is a view illustrating the manner in which the size of the display area is specified in the video game apparatus referred to above.

In addition, the frame size, i.e., the number of the pixels arranged on a CRT screen is variable. As shown in FIG. 10, the display area of the screen can be specified by determining therein both a display beginning position with coordinates (DTX, DTY), and a display ending position with coordinates (DBX, DBY).

Moreover, the GPU 62 supports display-color modes comprising: a 16-bit mode with a 32,768-color display; and, a 24-bit mode with a 16,777,216-color display.

Still further, in image-formation function, the GPU 62 also supports a so-called spline image-formation function with a frame size of from 1 (H: Horizontal)×1 (V: Vertical) to 256 (H)×256 (V) dots, the number of the dots being arbitrarily selected.

Figure 11:
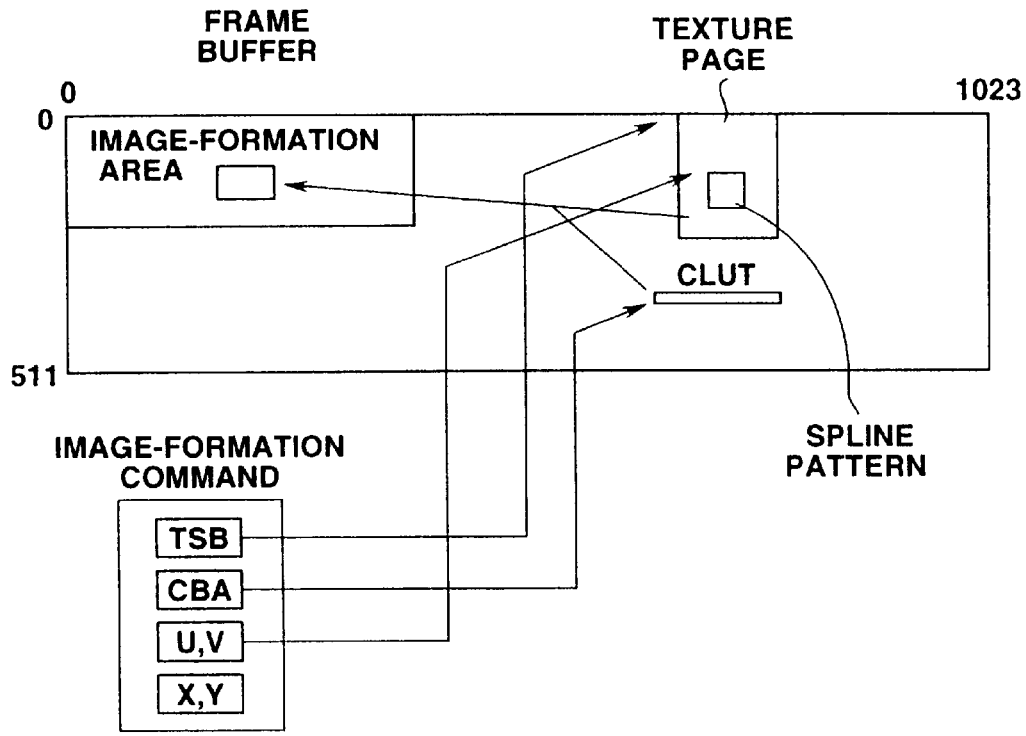
FIG. 11 is a view illustrating the spline image-formation operation in the video game apparatus referred to above.

In this connection, as shown in FIG. 11, an image data or spline pattern being added to a spline is transferred to the frame buffer before execution of an image-formation command, and is stored in a non-display area of the frame buffer.

It is possible to store any desired number of the spline patterns in the frame buffer as long as its capacity permits. In this regard, one page (i.e., texture page) has a size of 256×256 pixels.

Figure 12:
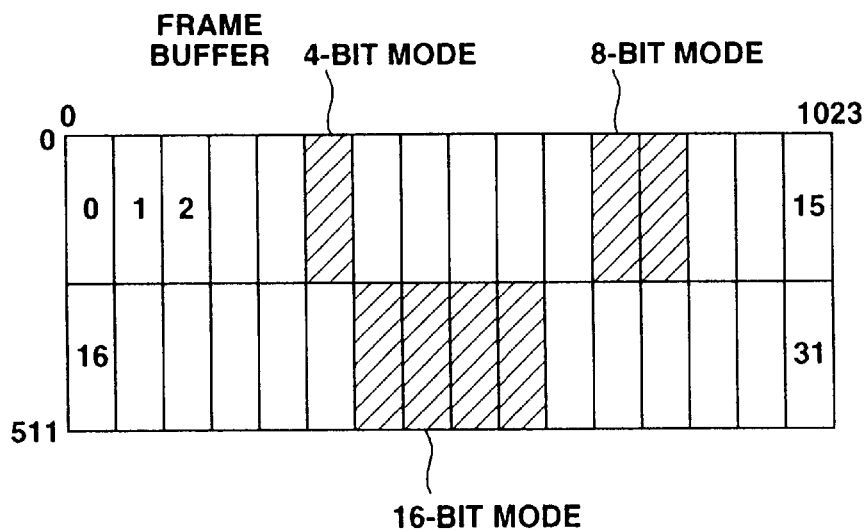
FIG. 12 is a view illustrating one of the texture pages in the video game apparatus referred to above.

As shown in FIG. 12, a size of the one texture page varies depending on the type of the mode. Further, as shown in FIG. 11, a location of the texture page in the frame buffer is determined by specifying a page number of a parameter called TSB in the image-formation command.

In the spline patterns, there are three types of color modes including a 4-bit CLUT mode, a 8-bit CLUT mode, and a 16-bit DIRECT mode.

In the 4-bit CLUT mode, a 16-color spline image formation is realized by using the CLUT. On the other hand, in a 8-bit CLUT mode, a 256-color spline image formation is realized by using the CLUT. Still further, in a 16-bit DIRECT mode, a 32,768-color spline image formation is realized by directly using the 16-bit system.

In the spline pattern in both the 4-bit CLUT mode and the 8-bit CLUT mode, a color of each of the pixels is represented by a specific number which specifies one of the RGB values of the CLUT disposed on the frame buffer, the number of the RGB values being within a range of from 16 to 256. It is possible to specify the CLUT in spline units. Further, it is also possible to provide a separate CLUT for any spline.

The image decoder 64 is controlled by the CPU 51 to decode the image data of still pictures or moving pictures which have been stored in the main memory 53, and the thus decoded data is stored in the main memory 53.

Such reproduced image data is stored in the frame buffer 63 through the GPU 62, which makes it possible to use the reproduced image data as a background of a picture produced by the GPU 62.

The sound system 70 comprises a sound processing unit (SPU) 71 which generates musical sounds, sound effects and the like upon receipt of an instruction issued from the CPU 51, a sound buffer 72 which is controlled by the SPU 71 to store a sound-wave data and like data therein, and a loudspeaker 73 for outputting the musical sounds, sound effects and the like generated by the SPU 71.

The SPU 71 is provided with an ADPCM decoding function for reproducing a sound data, the sound data being 16-bit sound data composed of 4-bit differential signals which have been subjected to processing of adaptive differential PCM (ADPCM), a reproducing function for generating the sound effects and the like by reproducing the sound-wave data stored in the sound buffer 72, and a modulator function for modulating the sound-wave data stored in the sound buffer 72 to reproduce the thus modulated sounds.

With the provisions of such functions, the sound system 70 is capable of being used as a so-called sampling sound source for generating musical sounds, sound effects and the like, based on the wave-data stored in the sound buffer 72 when it receives an instruction issued from the CPU 51.

The optical-disk control subsystem portion 80 comprises an optical-disk unit 81 for reproducing a program, data and the like stored in an optical disk, a decoder 82 for decoding a program, data and the like having been provided with, for example, an error correction code (ECC), a memory buffer 83 which temporarily stores reproduced data issued from the optical-disk unit 81 to facilitate retrieving of such data from the optical disk, and a sub-CPU 84 for control.

As with sound data stored in the optical disk used in the optical-disk unit 81, in addition to the ADPCM data, there is so-called PCM data which is a sound signal which has been subjected to an analog-to-digital conversion.

Sound data stored as the ADPCM data (in which a difference, for example, in 16-bit digital data is represented as a 4-bit word and stored in this word) is decoded in the decoder 82, then supplied to the SPU 71 in which the supplied data is subjected to the analog-to-digital conversion, and thereafter used to drive the loudspeaker 73. Further, sound data stored as the PCM data (which is stored, for example, as a 16-bit digital data) is also decoded in the decoder 82, and then used to drive the loudspeaker 73.

The communication control subsystem 90 is provided with a communication control unit 91 for controlling communications with the CPU 51 through a bus 100. Provided in the communication control unit 91 are a slot 93 connected with the controller 92 through which the user inputs his instruction, and a pair of card connectors 95A and 95B to which a pair of memory cards 94A and 94B for storing the game's setting data and the like data are connected, respectively.

The controller 92 connected with the slot 93 for receiving the user's instruction is provided with, for example, 16 control keys. Upon receipt of an instruction issued from the communication control unit 91, the controller 92 supplies data of the control key's conditions to the CPU 51 through synchronous communication, sixty times a second. The communication control unit 91 issues the data of the control key's conditions from the controller 92 to the CPU 51. As a result, the user's instruction is inputted to the CPU 51, so that the CPU 51 executes a necessary operation according to the user's instruction.

In addition, when the setting data of the game operated by the CPU 51 must be stored, the CPU 51 issues such data being stored to the communication control unit 91. Then, the unit 91 stores the data in one of the memory cards 93A and 93B which are connected with the card connectors 95A and 95B, respectively.

Further, incorporated in the communication control unit 91 is a protective circuit to prevent electrical failures. The memory cards 93A, 93B are separated from the bus 100. Consequently, the memory cards 93A, 93B are capable of being mounted and dismounted in a condition in which the power switch of the main unit is turned on. Therefore, when the memory lacks capacity, it is possible to mount a new one of the cards without turning off the power switch of the main unit. Consequently, there is no fear that necessary game data may be lost. Hence, it is possible to store such necessary game data in the new one of the memory cards being mounted.

Each of the memory cards 93A, 93B is constructed of a flash memory which permits random access, requires no backup power source, and has a microcomputer incorporated therein. When the memory cards 93A, 93B are connected with the card connectors 95A, 95B, electric power is supplied from the main unit to the microcomputer through the card connectors.

The memory cards 93A, 93B are recognized as file devices by an application, the file devices being identified by the use of hexadecimal numbers with two figures, such numbers specifying both the ports and the card connectors. Each of the memory cards 93A, 93B has an automatic initializing function which is performed when a file is opened.

When the memory cards 93A, 93B are connected with the card connectors 95A, 95B so that the main unit supplies electric power to these memory cards, the microcomputer initially sets an internal state of each of the memory cards at a "no-communication" state, and thereafter establishes communications with the memory cards through the communication control unit 91.

On the basis of a field representing an "internal state" in a response packet for confirmation of connection between the memory cards and the host in communication protocol, the CPU 51 in the main unit side tests an internal state of the microcomputer incorporated in each of the memory cards 93A, 93B which have been connected with the card connectors 95A, 95B. In the case of the "no communication" state, a new one of the memory cards 93A, 93B is recognized to be communicated, so that file control data relative to the new one of the memory cards 93A, 93B, for example, information as to file names, file sizes, slot numbers and the like, together with status information, are retrieved.

By means of such a communication protocol, it is possible to establish communications permitting the memory cards 93A, 93B to be dismounted as needed.

As a result, it is possible to store the game setting data in the pair of the memory cards 93A, 93B. Further, it is also possible to directly copy the data stored in the pair of the memory cards 93A, 93B and to directly transfer various data from the pair of the memory cards 93A, 93B to the main unit at the same time.

Since each of the memory cards 93A, 93B is constructed of a flash memory which is randomly accessible and requires no backup power supply, it is possible for the memory cards 93A, 93B to store the data for a substantially indefinite period of time.

Further, this video game apparatus is provided with a parallel input/output (PIO) 101 and a serial input/output (SIO) 102, both of which are connected with the bus 100.

The video game apparatus is capable of communicating with the peripheral devices through the parallel input/output (PIO) 101, and also capable of communicating with other video game apparatuses through the serial input/output (SIO) 102.

As described above, in the texture mapping method and apparatus of the present invention, a representing-point extracting means extracts a representing point from an area of a polygon which forms a fundamental unit of three-dimensional image information of an object to be displayed on the computer screen, a perspective transformation means performs a perspective transformation of the coordinates of the representing point having been extracted by the representing-point extracting means, and a linear interpolation between the representing points having been subjected to the perspective transformation through the perspective-transformation means is performed. Consequently, regarding computation volume, the texture mapping apparatus of the present invention has considerably less requirements in comparison to the conventional apparatus in which all the points within the polygonal area are subjected to the perspective transformation. Therefore, it is possible for the texture mapping apparatus of the present invention to realize a real-time solid naturally-mapped image on the computer screen.

Furthermore, in the texture mapping apparatus of the present invention, the representing-point extracting means extracts the representing points which varies in number in accordance with the size of the polygonal area, and which optimizes the computation volume to make it possible to obtain a solid and naturally-mapped image on the computer screen.

Hence, the present invention satisfies a long existing need for enhanced image processing providing for simplified texture mapping transformation with reduced image distortion and minimal required calculation.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. A method for producing a polygon image, comprising the steps of:

(a) storing a texture pattern in a memory device;

(b) carrying out a perspective transformation upon the vertices of said polygon image:

(c) generating representing points based on said vertices of said polygon image, each of said representing points being included in the area of said polygon image forming a fundamental unit of information in a three dimensional image object to be graphically displayed;

(d) when a plurality of representing points are generated, carrying out a perspective transformation upon said representing points;

(e) generating a display command for one or more polygons respectively; and (f) specifying a texture pixel read out from said memory device corresponding to the interpolation of said representing points based on said respective display command.

2. The method as set forth in claim 1 further comprising the step of:

mapping said texture pixel on said polygon image.

3. The method as set forth in claim 1, wherein said generating step selects the number of said representing points in response to the size of said polygon image.

4. The method as set forth in claim 1, wherein said generating step selects the positions of said representing points in response to the area of said polygon image.

5. The method as set forth in any of claims 1–4 further comprising the step of performing linear interpolation upon said representing points, whereby distortion is minimized.

6. The method as set forth in claim 1, wherein said specifying step specifies the texture pixel read out from said memory device corresponding to each linearly interpolated point which is transformed.

7. The method as set forth in claim 1 wherein said perspective-transformed vertices and said perspective-transformed representing points define one or more sub-polygons which form said polygon image and said step of generating a display command comprises the step of generating a display command for each sub-polygon.

8. The method as set forth in claim 1 wherein the number of representing points is less than the number of points included in a line between said vertices of said polygon image.

9. The method as set forth in claim 1 further comprising the step of storing image data in said memory device.

10. An apparatus for producing a polygon image, said apparatus comprising:

(a) a memory device for storing a texture pattern;

(b) a first generating device for generating representing points based on said vertices of said polygon image, each of said representing points being included in the area of said polygon image forming a fundamental unit of information in a three dimensional image object to be graphically displayed;

(c) a converting device for carrying out a perspective transformation upon said vertices and for carrying out a perspective transformation upon said representing points when a plurality of representing points are generated;

(d) a second generating device for generating a display command for one or more polygons respectively; and (e) a specifying device for specifying a texture pixel read out from said memory device corresponding to the interpolation of said representing points based on said display command.

11. The apparatus as set forth in claim 10, and further comprising:

a drawing device for mapping said texture pixel on said polygon image.

12. The apparatus as set forth in claim 10, wherein said first generating device selects the number of said representing points in response to the size of said polygon.

13. The apparatus as set forth in claim 10, wherein said first generating device selects the positions of said representing points in response to the area of said polygon image.

14. The apparatus as set forth in claim 10, wherein said specifying device specifies the texture pixel read out from said memory device corresponding to each linearly interpolated point which is transformed.

15. The apparatus as set forth in any of claims 10–14 wherein said apparatus includes an interpolation device for performing linear interpolation upon said representing points, whereby distortion is minimized.

16. The apparatus as set forth in claim 10 wherein said perspective-transformed vertices and said perspective-transformed representing points define one or more sub-polygons which form said polygon image and said second generating device generates a display command for each sub-polygon.

17. The apparatus as set forth in claim 10 wherein the number of representing points is less than the number of points included in a line between said vertices of said polygon image.

18. The apparatus as set forth in claim 10 wherein said memory device also has an area for storing an image data to be displayed.

19. An apparatus for mapping texture stored in a memory device to a polygonal area, said apparatus comprising:

a representing-point extracting device for extracting representing points from said polygonal area wherein said representing points include non-vertex points, said representing points being extracted based on the vertices of said polygonal area and included in said polygonal area forming a fundamental unit of information in a three dimensional image object to be graphically displayed;

a perspective-transformation device for performing a perspective transformation of the coordinates of said representing points which have been extracted through said representing-point extracting device when a plurality of representing points are extracted; and a linear-interpolation device for performing a linear interpolation between said representing points which have been subjected to said perspective transformation through said perspective-transformation device;

whereby image information, in which said texture is added to said polygonal area, is obtained as an interpolation output issued from said linear-interpolation device with a minimum of distortion and reduced computation.

20. The apparatus, as set forth in claim 19, wherein the number of said representing points extracted by said representing-point extracting device varies in accordance with the size of said polygonal area.

21. A method for processing image data to form a polygon image, said method comprising the steps of:

storing image data including three-dimensional coordinates of image points;

extracting representative coordinates for representing points in said image data in addition to said three-dimensional coordinates in said image data, said representing points being non-vertex points and extracted based on the vertices of said polygonal area and included in the area of said polygon image forming a fundamental unit of information in a three dimensional image object to be graphically displayed, said representing points for minimizing image distortion normally resulting from coordinate transformation; and linearly interpolating and transforming said image data and linearly interpolating and transforming said representing points when a plurality of representing points are extracted, to convert said three-dimensional coordinates of image points and said additional representative coordinates to two-dimensional image data with a minimum of distortion requiring minimum computation.

22. A method of processing image data to form a polygon image, said method comprising the steps of:
 (a) storing one or more texture data;
 (b) extracting representing points from said polygon based on the vertices of said polygon;
 c) carrying out a perspective transformation upon said vertices and carrying out a perspective transformation upon said representing points when a plurality of representing points are extracted;
 (d) generating an image-forming list for the respective new polygons defined by said vertices and said representing points respectively; and
 (e) executing a texture mapping process using one of said texture data based on said image-forming list.

* * * * *